|   | A<br>A' | B<br>B' | C<br>C' | D<br>D' |
|---|---|---|---|---|
| 1 | N | S | S | N |
| 2 | N | S | N | S |
| 3 | S | N | N | S |
| 4 | S | N | S | N |
| 5 | N | S | S | N |
| 6 | N | S | N | S |
| 7 | S | N | N | S |
| 8 | S | N | S | N |
| 9 | N | S | S | N |
| 10 | N | S | N | S |
| 11 | S | N | N | S |
| 12 | S | N | S | N |

INVENTOR.
MORTON SKLAROFF

BY Arthur H. Swenson

ATTORNEY.

Sept. 26, 1967  M. SKLAROFF  3,344,325
STEP MOTOR INCLUDING PERMANENT MAGNET
ROTOR AND SECTIONED STATOR
Filed May 4, 1965  2 Sheets-Sheet 2

INVENTOR.
MORTON SKLAROFF
BY
ATTORNEY.

United States Patent Office 3,344,325
Patented Sept. 26, 1967

3,344,325
STEP MOTOR INCLUDING PERMANENT MAGNET ROTOR AND SECTIONED STATOR
Morton Sklaroff, Philadelphia County, Pa., assignor to Honeywell Inc., Minneapolis, Minn., a corporation of Delaware
Filed May 4, 1965, Ser. No. 453,002
4 Claims. (Cl. 318—138)

This invention relates to electrical motors. More specifically, the present invention relates to electrical stepping motors.

An object of the present invention is to provide an improved high torque electrical stepping motor.

Another object of the present invention is to provide a reversible electrical stepping motor.

A further object of the present invention is to provide an improved stepping motor having a high holding force for each stepping position.

A still further object of the present invention is to provide an improved reversible stepping motor having a self-synchronized non-commutating electrical structure.

Still another object of the present invention is to provide an improved stepping motor, as set forth herein, having a simplified structure.

In accomplishing these and other objects, there has been provided, in accordance with the present invention, an electrical stepping motor having a plurality of field pole sectors energized by separate field coil means. A permanent magnet rotor having a plurality of rotor pole tips is arranged to be actuated by the attractive and repulsive magnetic forces developed in conjunction with the pole sectors. A field coil energizing circuit is used to produce a predetermined pattern of magnetic field poles to correspond to a desired direction of rotation of the rotor. The energizing circuit is self-synchronizing to maintain a desired rotor rotation even after a disruption of the pattern of field poles produced by the energizing circuit.

A better understanding of the present invention may be had when the following detailed description is read in connection with the accompanying drawings, in which.

Figures 1, 2:
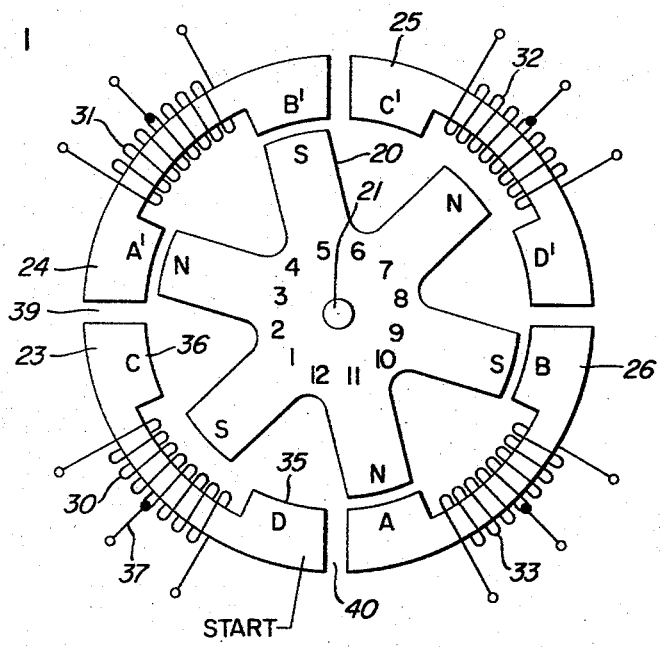
FIG. 1 is a pictorial end view of a stepping motor embodying the present invention.
FIG. 2 is a chart showing the energization sequence of motor field coils.

Referring to FIG. 1 in more detail, there is shown a stepping motor structure embodying the present invention. This structure comprises an armature, or rotor, 20 mounted for rotation on a central shaft 21. The armature 20 is made of a permanent magnetic material and is provided with a plurality of pole tips arranged with uniform spacing on its circumference. The pole tips are alternately magnetized with opposite magnetic poles. As shown in FIG. 1, the armature 20 is provided with six pole tips alternately magnetized with opposite poles as indicated by the letters N and S.

The stationary part of the motor includes a plurality of individual stator pieces 23, 24, 25 and 26 arranged symmetrically in a circle to enclose the rotor. Each stator element is provided with a pair of field poles spaced apart a distance equal to the spacing of the pole tips and an energizing winding. The pieces 23, 24, 25 and 26 are respectively energized by field windings 30, 31, 32 and 33. These windings are energized from the circuit shown in FIG. 3. The field windings are effective to magnetize the stator pieces to produce opposite magnetic poles at the field poles on each stator piece. Referring to stator piece 23, for example, as a typical stator element, there is provided a winding 30 and a pair of field poles 35 and 36. The winding 30 is provided with a center tap 37. The stator element 23 is separated at both ends by non-magnetic gaps 39 and 40 from the adjacent stator elements 24 and 26, respectively. The stator elements 23, 24, 25 and 26 are held in a fixed position, as shown in FIG. 1, by a non-magnetic structure, not shown, which may comprise a pair of aluminum end plates which are arranged to clamp the stator elements 23, 24, 25 and 26 between them while providing access for the armature shaft 21. In general, it has been determined that the relationship of the number of pole tips to the number of sector pieces may be determined as follows: The number of pole tips necessary to practice the present invention is given by the expression "$6X$" where $X$ is any positive integral number including "1." The number of sector pieces is then determined from the expression "$6X-2X$" where $X$ is the same as the number used for the pole tips.

In operation, the motor shown in FIG. 1 is stepped between successive stable positions by a progressive reversing of the magnetic fields from the stator elements 23, 24, 25 and 26. This magnetic field reversal is executed in accordance with the table shown in FIG. 2. Assume the rotor 20 is in the position illustrated with pole tips 3 and 11 adjacent non-magnetic gaps 39 and 40 formed by the adjacent stator elements 23, 24 and 26. The stator elements 23, 24, 25 and 26 are held in a fixed position, as shown in FIG. 1, by a non-magnetic structure, not shown, which may comprise a pair of aluminum end plates which are arranged to clamp the stator elements 23, 24, 25 and 26 between them while providing access for the recess marked 12 aligned with the line marked "start." If the windings 30, 31, 32 and 33 are energized to produce the magnetic fields at the stator poles A, A', B, B', C, C', and D, D' as shown in line "1" of the table in FIG. 2, the rotor 20 in induced to move in a counter-clockwise direction by having the rotor pole tip 1 attracted to field pole 35 which has a north pole magnetic field while it concurrently repelled from field pole 36 which has a south pole magnetic field. However, rotor pole tip 3 is attracted to the field pole 36. A similar action occurs at the stator piece 25 with respect to rotor pole tips 7 and 9. Thus, these pole tips and stator pieces are determinative of the direction of rotation.

The torque of the rotation operation, however, is further aided by the simultaneous repelling action at stator pieces 24 and 26 with respect to rotor pole tips 3, 5, 9 and 11. The final position of the rotor 20 is arrived at when pole tips 1 and 3 are aligned with field poles 35 and 36, respectively. Similarly, pole tips 7 and 9 are alinged with stator piece 25. Additionally, the pole tips 5 and 11 are aligned with the cut-out portions of stator pieces 24 and 26; and, specifically, pole tip 1 in the rotor 20 is aligned with "start" line. If the magnetic fields are now removed, the motor is locked in this position by the combined effect of rotor pole tips 1, 3, 7 and 9 which are attracted to the corresponding stator pieces 23 and 25. Thus, these stator pieces are arranged to provide a closed magnetic path for the magnetic field from the pole tips 1, 3, 7 and 9.

If it is desired to continue stepping the rotor 20, the magnetic fields on stator pieces 24 and 26 are retained in prior state as shown in the table in FIG. 2. However, the magnetic fields of stator pieces 23 and 25 are reversed as shown in step "2" of the table. This magnetic field arrangement is effective to attract pole tips 5 and 11 to continue the counterclockwise rotation of the rotor 20 while the rotor torque is enhanced by the simultaneous repulsion of the pole tips 1, 3, 7 and 9 from the stator pieces 23 and 25. The final position of the rotor 20 has notch 2 aligned with "start" line while pole tips 1, 11, 5 and 7 are attracted to the stator pieces 26 and 24, respectively. Further stepping of the motor is effected by the successive magnetic field arrangements shown in FIG. 2 under the steps "3" to "12". When notch 12 is again aligned with the "start" line, the rotor 20 has completed one revolution.

It is to be noted that magnetic field reversals may be effected at a relatively high speed to achieve a substantially continuous rotation of the rotor 20. In either a slow or fast mode of operation, the torque of the motor is considerably enhanced by the simultaneous double repulsion and attraction while the inert position of the rotor 20 is retained with a high degree of stability owing to the combined effect of two stator pieces completing respective magnetic paths for two pairs of rotor pole tips. Thus, the motor is able to resist an undesired backward rotation at each step of the rotor rotation. If it is desired to reverse the direction of rotation of the rotor 20 to clockwise, the simplest method would be one in which the arrangement of the magnetic poles shown in FIG. 2 would be reversed. For example, for step "1," the poles A, A' and D, D' would be south magnetic fields and poles B, B' and C, C' would be north magnetic fields. In either direction of rotation, the forward torque and backward stability would be equally present. There is no need to synchronize the energization of the windings 30, 31, 32 and 33 since the rotor 20 will continue to run in synchronism until the maximum speed of the motor is reached. At this point, the transfer of the rotor pole tips will lag behind the magnetic field reversals owing to mechanical losses and the rotor 20 will be unable to further increase its rotational speed. Obviously, the motor should be run below this critical speed to insure synchronization and mechanical stability of torque and direction of rotation.

Figure 3:
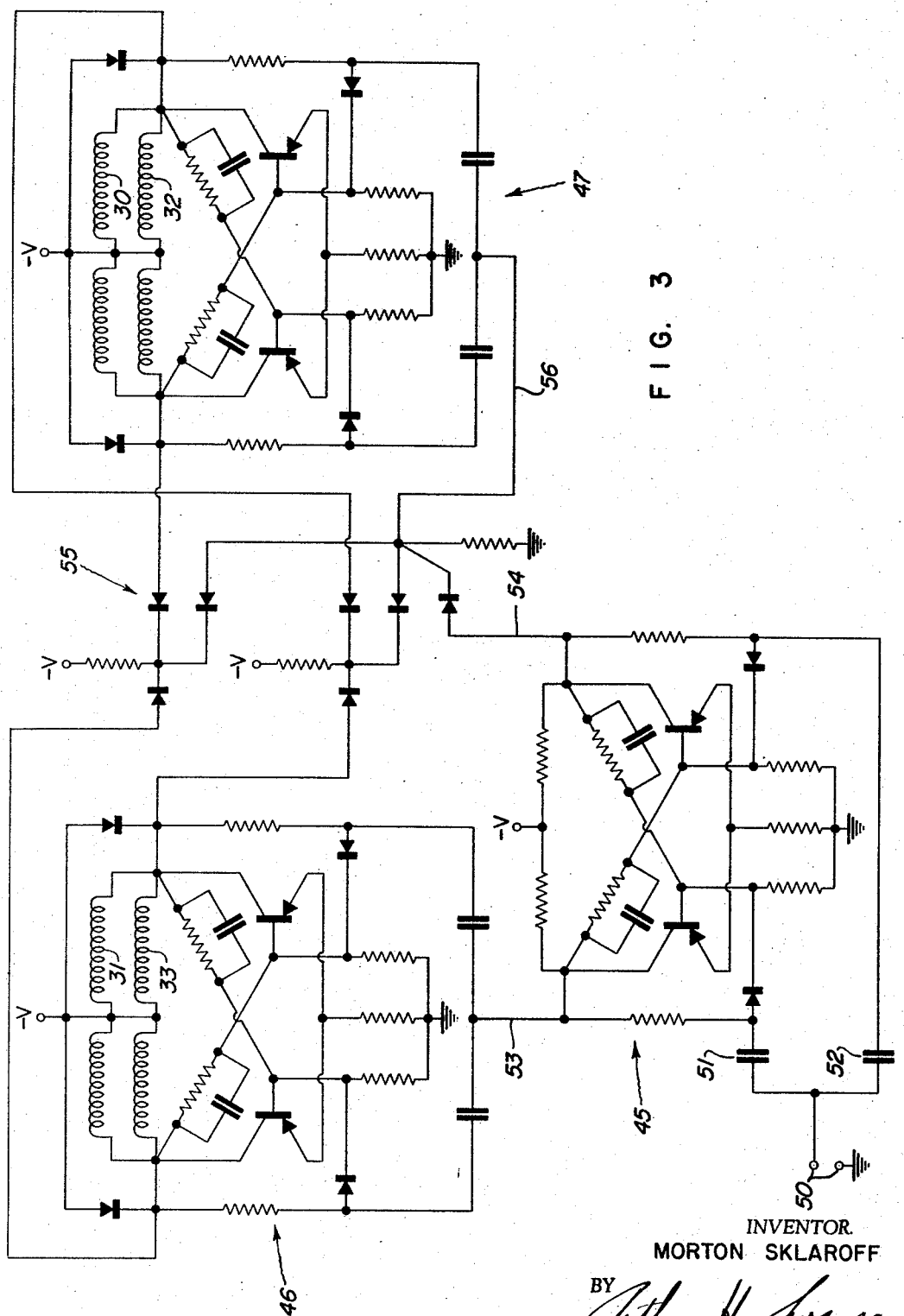
FIG. 3 is a schematic illustration of a field coil energizing circuit suitable for use with the motor shown in FIG. 1.

In FIG. 3, there is shown a circuit for energizing the windings of the motor shown in FIG. 1. The circuit of FIG. 3 comprises three flip-flop circuits 45, 46 and 47. A first flip-flop 45 is connected to a pair of input terminals 50 which are arranged to be connected to a source of signals for stepping the motor of FIG. 1. These signals are connected by capacitors 51 and 52 to both sides of the flip-flop 45 to change the state of flip-flop 45 for each applied input signal. The output signals from flip-flop 45 are applied over output lines 53 and 54 to the flip-flops 46 and 47 to change their operative state in a predetermined fashion whereby the corresponding magnetic fields are switched in a manner corresponding to the chart shown in FIG. 2. A signal steering circuit 55 is connected between the output line 54 of the flip-flop 45 and the flip-flop 46 and an input line 56 to the flip-flop 47 to maintain a circuit operation wherein the flip-flops 46 and 47 are switched in the order necessary to continue a pre-selected direction of rotation of the motor rotor 20.

The motor windings 30, 31, 32, and 33 are connected to the output signals of corresponding flip-flops. Specifically, motor windings 31 and 33 are connected to flip-flop 46 and windings 30 and 32 to flip-flop 47. These windings are connected to the flip-flops with the center-tap of each winding being connected to a negative supply —V and the ends of the windings to the flip-flop output circuits. Thus, half of each winding connected to a flip-flop is energized in one state of the flip-flop while the other half is energized in the other state of the flip-flop. It may be seen that this arrangement is effective to reverse the magnetic field produced by a winding since the current flow in one half of the winding will be in an opposite direction to that in the other half. Thus, the flip-flops 46 and 47 are effective to change the magnetic fields at the stator field poles in the manner shown in FIG. 2 if only one of the flip-flops is actuated between its stable states at a time and the flip-flops 46 and 47 are used alternately.

The circuit shown in FIG. 3 is arranged to achieve this mode of operation. Thus, the input flip-flop 45 is actuated between its stable states for each input signal applied to the input terminals 50. This alternate state of flip-flop 45 is connected to flip-flops 46 and 47 by output lines 53 and 54, respectively. However, the flip-flops 46 and 47 are actuated between their stable states only for a particular polarity input signal; e.g., positive. This input signal occurs only on alternate changes of state of the input flip-flop 45. Accordingly, th flip-flops 46 and 47 are actuated between their stable states by alternate state changes of flip-flops 45. In other words, the proper signal appears on lines 53 and 54 for each two state changes of flip-flop 45 so that flip-flop 46, for example, will not change its state until the input flip-flop 45 has returned to its prior state and is switched again by the input signals on the input terminals 50.

The switching of flip-flops 46 and 47 is effective to reverse the magnetic fields in the corresponding windings since the winding current will flow in an opposite direction from one flip-flop state to another. In the event that an extraneous signal is effective to accidentally switch one of the flip-flops 46 and 47 before the next change of state of the flip-flop 45, the steering circuit 55 is provided to prevent the next change of state of the flip-flop 45 from causing a reversal of the rotation of the rotor 20. The steering circuit 55 is effective to apply the next signal on line 54 to the flip-flop which is required to bring the magnetic fields back into the proper sequence. Specifically, the magnetic fields are switched to an arrangement which is a preceding step on the table of FIG. 2 from that caused by the noise signal. Subsequently, the next change of flip-flop 45 is effective to produce a correct state of flip-flops 46 and 47 in the sequence to maintain the desired direction of rotation. If it is desired to reverse the direction of rotation of rotor 20, it is only necessary to reverse the connections of lines 53 and 56. This reversal will effect a reversal of the sequence of changes of the magnetic fields from those shown in FIG. 2 and to produce a reversal of the direction of rotation, as discussed above.

Accordingly, it may be seen that there has been provided, in accordance with the present invention, an improved reversible stepping motor having a high rotational torque with stepping position stability and a non-commutating electrical circuit for energizing the motor and maintaining a desired direction of rotation.

What is claimed is:

1. A stepping motor comprising a rotor having an even number of permanent magnet poles determined according to the relation $6X$ where $X \geqq 1$ polarized radially of the rotor and which face directly outward from the periphery of the rotor, said magnet poles being evenly arranged and in alternate polarity around said periphery, stator means having an even number of stator sectors determined according to the relation $6X-2X$ where $X \geqq 1$, said sectors being symmetrically arranged in a circle to enclose said rotor and separated therefrom and from each other by non-magnetic gaps, each of said sectors having a pair of field pole faces spaced to correspond to the spacing of said magnet poles and a plurality of energizing windings inductively coupled to individual ones of said sector pieces to provide opposite magnetic poles at said pole faces on each of said sectors.

2. A stepping motor comprising a rotor having a plurality of permanent magnet poles polarized radially of said rotor and facing directly outward from the periphery of said rotor, said magnet poles being evenly arranged and in alternate polarity around said periphery, stator means having a plurality of stator sectors, said stator sectors being symmetrically arranged in a circle to enclose said rotor and separated therefrom and from each other by non-magnetic gaps, each of said sectors having a pair of field pole faces spaced to correspond to the spacing of said magnet poles and a plurality of energizing windings inductively coupled to individual ones of said sector pieces to provide opposite magnetic poles at said pole faces on each of said sectors, said sectors being less in number than magnet poles on said rotor whereby at least two of said magnet poles will fall between said pole faces when the other ones of said magnet poles and pole faces are in substantial alignment.

3. A stepping motor as set forth in claim 2 wherein said stator means includes an energizing means for said energizing windings, said energizing means including a plurality of bistable means connected to respective ones of said energizing windings, each of said bistable means being operative in combination with a respective one of said windings to produce a first magnetic pole arrangement on a corresponding stator sector in a first stable state of said bistable means and a second pole arrangement in a second stable state of bistable means and an input signal means operative to simultaneously control the state of said bistable means according to a predetermined progressive pattern.

4. A stepping motor as set forth in claim 3 wherein said energizing means includes a signal steering means connected between said input means and said bistable means and operative in response to said input means to set said bistable means to a step in said pattern prior to a step produced by an undesired setting of said bistable means by an extraneous signal whereby to restore said pattern.

No references cited.

ORIS L. RADER, *Primary Examiner.*

G. SIMMONS, *Assistant Examiner.*